C. A. CLAFLIN.
AUTOMATICALLY DRAINED GATE VALVE.
APPLICATION FILED SEPT. 6, 1907.
898,722.
Patented Sept. 15, 1908.
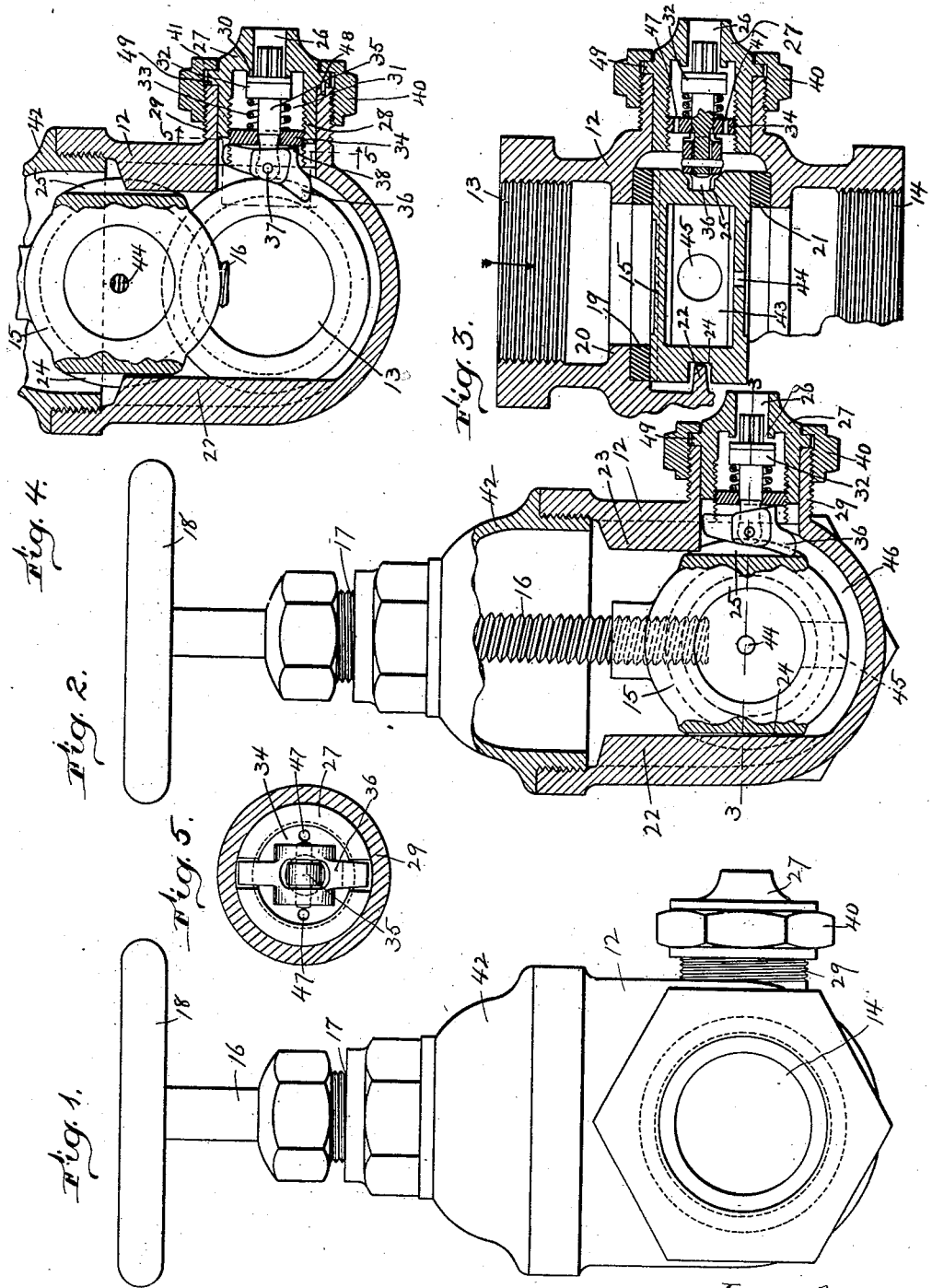
Witnesses:
Forest Roulstone
E Batchelder
Inventor:
C. A. Claflin
by Wright Brown Quinby May
Attys.

UNITED STATES PATENT OFFICE.

CHARLES A. CLAFLIN, OF MEDFORD, MASSACHUSETTS.

AUTOMATICALLY-DRAINED GATE-VALVE.

No. 898,722.     Specification of Letters Patent.     Patented Sept. 15, 1908.

Application filed September 6, 1907. Serial No. 391,621.

*To all whom it may concern:*

Be it known that I, CHARLES A. CLAFLIN, of Medford, in the county of Middlesex and State of Massachusetts, have invented certain new and useful Improvements in Automatically-Drained Gate-Valves, of which the following is a specification.

This invention relates to a gate valve having a sliding gate which, when closed, has a liquid-tight bearing on a seat at the inlet side of the valve, a drain outlet being provided which is opened when the gate is closed, and releases the water remaining in the valve casing and the piping connected therewith at the outlet side of the gate, thus preventing an accumulation of water liable to cause damage by freezing or corrosion.

The invention has for its object to provide a gate valve of this character, having a drain outlet controlled by a valve which is automatically closed when the gate is opened, thus preventing the escape of liquid through the drain outlet, and is opened by the closing movement of the gate, so that when the gate is closed, the greater part of the water remaining at its outlet side will be released, the drain outlet and the valve coöperating therewith being detachable from the gate valve casing.

The invention consists in the improvements which I will now proceed to describe and claim.

Of the accompanying drawings, forming a part of this specification, and illustrating a suitable embodiment of my invention,—Figure 1 represents an end elevation of a gate valve provided with a drain outlet in accordance with my invention. Fig. 2 represents a transverse section of the same, the gate being shown in its closed position. Fig. 3 represents a section on line 3—3 of Fig. 2. Fig. 4 represents a view similar to Fig. 2, showing the gate in its opened position. Fig. 5 represents a section on line 5—5 of Fig. 4.

The same letters of reference indicate the same parts in all the figures.

In the drawings, 12 represents a gate valve casing having an inlet end 13 and an outlet end 14, said parts being internally threaded or otherwise adapted to be connected to pipe sections. 15 represents a sliding gate which is movable to the closed position shown in Figs. 2 and 3, and the opened position shown in Fig. 4, the preferred means for operating the gate being a stem 16 journaled in a stuffing box 17 on the casing, and having a threaded inner portion engaging an internal thread in the gate 15. When the stem is rotated by means of a hand wheel 18 or other suitable handle, the gate is moved to either open or close the inlet passage 13, according to the direction of rotation of the stem. The casing is provided at the inlet side of the gate with a seat for the latter, which seat is here shown as composed of a ring or washer 19 of any suitable material, preferably compressible, and a flange 20 formed integral with the casing, and backing the ring 19. For convenience I will hereinafter refer to the ring 19 as the inlet seat. Means are provided for pressing the gate firmly against the inlet seat when the gate is moved to its closed position shown in Fig. 2, said means being preferably a seat 21 of similar construction to the seat 19, and located at the outlet side of the gate in position to bear on the latter, and hold it firmly against the inlet seat when closed. The casing is provided with inwardly-projecting guides 22 23 which engage notches 24 25 in the perimeter of the gate, and prevent the gate from turning with the stem. The construction thus far described is common and well known.

In carrying out my invention, I provide the casing 12 with a drain outlet, 26, which is preferably formed in a drain terminal 27, having an enlarged tubular portion 28 inserted in an externally threaded nipple 29 formed integral with the casing 12, and projecting outwardly from one side thereof, the passage through said nipple being between the gate seats 19 and 21. The drain terminal 27 is provided with a seat 30 surrounded by the chamber or enlarged interior portion 31 of the terminal.

32 represents a drain valve adapted to close outwardly against the seat 30, and thus close the drain outlet, said valve being automatically closed both by liquid pressure in the casing and by a spring 33 interposed between the drain valve 32 and an abutment or guide piece 34 inserted in the enlarged end of the terminal 27, the said guide piece being preferably engaged with the terminal by means of an external thread formed on its periphery, and an internal thread formed in the interior of the enlarged portion of the terminal. The guide piece has a central opening in which the stem 35 of the drain valve 32 is adapted to slide, said stem projecting inwardly.

36 represents a lever pivoted at 37 to the inner end portion of the valve stem 35, said lever having a fulcrum shoulder or projection 38 bearing against the guide piece 34. The form of the lever is such that when the drain valve is closed, the lever is inclined as shown in Fig. 4, its lower end projecting inwardly into the path of the gate 15, so that when the gate is moved toward its closed position, it encounters the lever 36, and tips the latter as indicated in Fig. 2, causing the lever to rock on its fulcrum 38, and thus pull the valve stem and the drain valve inwardly to unseat the drain valve and open the drain outlet. When the gate is opened, the spring 33 acts to seat the drain valve 32, and move the lower end of the lever 36 inwardly into the path of the gate. The lever 36 is preferably formed to engage the portion of the gate which contains the notch 25, although this is not essential, as any suitable part of the side of the gate may act to rock the lever 36 when the gate is moving to its closed position. The terminal 27 is here shown as detachably secured to the casing by means of a coupling nut 40 engaged with an external thread on the nipple 29, and having a flange 41 bearing on a shoulder formed on the terminal.

It will be seen that the drain outlet, the drain valve and the means which coöperate with the gate in opening the valve, when the gate is moving to its closed position, are all carried by the terminal 27, so that said parts may be conveniently removed at any time from the exterior of the gate valve casing, and renewed or repaired without the necessity of opening the casing or removing the bonnet 42 which supports the stuffing-box 17, so that the drain valve and the parts associated therewith, may be conveniently removed at any time for the purpose of repairing or renewing the valve or any of the said parts with the minimum expenditure of time and labor, and without removing the gate valve casing from the pipe line. I believe myself to be the first to provide a gate valve casing having a detachable drain outlet with an automatically closed drain valve, and means operated by the closing movement of the gate for opening the drain valve; hence my invention is not limited to the details of construction here shown.

The gate 15 is provided, as usual in this class of valves, with a conduit connecting the outlet side of the gate with the drain outlet, said conduit, as here shown, including a chamber 43 within the gate, an orifice 44 in the outlet side of the gate communicating with said chamber, and an orifice 45 in the lower perimeter of the gate, said orifice connecting the chamber 43 with a passage 46 formed between the closed gate and the adjacent portion of the casing 12, said passage communicating with the drain outlet.

The guide piece or abutment 34 is provided with passages 47 through which liquid flows from the casing 12 to the drain outlet 26, when the drain valve is opened.

It will be seen that by providing a drain outlet having an automatically-closed valve, and the rocking lever 36 pivoted to the inner end of the stem of the valve, and located in the path of the gate 15, so that the lever is rocked by the closing movement of the gate, and caused to open the drain valve, I am enabled to locate the drain outlet so near the lower portion of the valve casing 12 that the liquid-containing space in the casing below the level of the drain outlet, is reduced to the minimum, the liquid contained in said space being insufficient to cause damage by freezing.

The pressure of the liquid in the valve casing is outward against the drain valve 32, and assists in holding said valve against its seat. Said pressure may be relied on to seat the drain valve in case the spring fails to act. To insure the proper position of the lever 36, with relation to the gate, or the notch therein, I provide means such as a dowel pin 48 projecting from the outer end of the nipple 29, and adapted to enter a hole formed for its reception in the flange of the terminal 27. Obviously, the dowel pin may be affixed to the flange of the terminal 27 and enter a socket formed for its reception in the nipple 29.

It will be observed that the means for actuating the drain valve can not interfere with the seating of the gate. This is due to the fact that the means which actuate said drain valve are located at one side of the gate which can therefore continue to slide to a closed position after fully opening the drain valve.

It will be seen by reference to Fig. 2 that the nipple 29 extends horizontally from one side of the casing 12, and is located above the bottom portion of said casing, so that the passage 46 is lower than the drain valve, and constitutes a sediment chamber which prevents sediment that may accumulate in the casing from obstructing the drain valve 32. The extent to which the terminal 27 is inserted into the casing 12 is determined by a flange 49 on said terminal, the flange bearing against the outer end of the nipple 29 and being formed to engage the coupling nut 40.

I claim:—

1. A gate valve comprising a casing having a gate seat and a drain outlet at the outlet side of said seat, an automatically closed drain valve controlling said outlet, a slidable gate controlling the liquid passage through the casing, and means operated by the closing movement of the gate for opening the drain valve, said means being located in a path of movement of a side portion of the gate.

2. A gate valve comprising a casing having a gate seat and a drain outlet at the outlet side of said seat, a drain valve controlling said outlet, a slidable gate having a drain conduit, and means operated by the closing movement of the gate for moving the drain valve from its seat to open the drain outlet, said means being located in a path of movement of a side portion of the gate.

3. A gate valve comprising a casing having a gate seat and a drain outlet at the outlet side of said seat, an automatically closed drain valve controlling said outlet, and having an inwardly-projecting stem, a lever pivoted to the inner end of the stem, and fulcrumed at one side of the stem, and a slidable gate controlling the liquid passage through the casing, the said lever projecting into the path of movement of a side portion of the gate and being movable by the closing movement of the gate to open the drain valve.

4. A gate valve comprising a casing having a passage extending through it from end to end, a gate seat within said passage, and an externally threaded nipple projecting laterally from the casing between its ends and the outlet side of the seat, a drain terminal closely fitting the interior of said nipple, and provided with an external collar abutting against the outer end of the nipple, a drain outlet, and an outwardly closing valve controlling said outlet, a coupling nut engaged with said nipple and collar, a slidable gate controlling the liquid passage through the casing, and means operated by the closing movement of the gate for opening the drain valve, the casing having a sediment pocket located below the drain valve, said means being carried by the drain terminal and removable therewith.

5. A gate valve comprising a casing having a gate seat and a drain terminal detachably secured to the casing at the outlet side of said seat, and provided with a drain outlet and with an automatically-closed valve controlling said outlet, a slidable gate controlling the liquid passage through the casing, means operated by the closing movement of the gate for opening the drain valve, said means being carried by the drain terminal within the casing, and means for determining the adjustment of the terminal relatively to the gate.

6. A gate valve comprising a casing having a gate seat and a tubular nipple at the outlet side of the seat, a drain terminal detachably secured in said nipple and having a drain outlet and an abutment, a spring-closed drain valve controlling said outlet, and having an inwardly-projecting stem, a lever pivoted to the inner end of the stem, and fulcrumed on said abutment, and a slidable gate controlling the liquid passage through the casing, the said lever projecting into the path of movement of a side portion of the gate and being movable by the closing movement of the gate to open the drain valve.

In testimony whereof I have affixed my signature, in presence of two witnesses.

CHARLES A. CLAFLIN.

Witnesses:
E. BATCHELDER,
P. W. PEZZETTI.